July 14, 1959 J. LOXHAM 2,894,741

MECHANICAL GUIDING DEVICES

Filed Nov. 3, 1958

United States Patent Office 2,894,741

Patented July 14, 1959

2,894,741

MECHANICAL GUIDING DEVICES

John Loxham, Cranfield, Bletchley, England, assignor to The Sigma Instrument Company Limited, Hertfordshire, England, a British company Application November 3, 1958, Serial No. 771,529

Claims priority, application Great Britain November 1, 1957

3 Claims. (Cl. 267—1)

This invention relates to mechanical guiding devices arranged for guiding the movement of a movable member with respect to a fixed member.

According to the present invention there is provided a mechanical guiding device arranged for guiding the movement of a movable member with respect to a fixed member, the movable member being maintained in relation to the fixed member through the intermediary of first and second spring strip arrangements, wherein each spring strip arrangement comprises two spring strips one end of each of which is secured to the fixed member and the other end of each strip being secured to the movable member, one of the spring strips being effectively shorter than the other spring strip so that the latter assumes an arcuate form and maintains said one strip in tension, wherein said arcuate strips are between said one strips, and wherein that side of each said one strip that is remote from the other spring strip arrangement faces away from all the remaining spring strips of the device.

For a better understanding of the invention and to show how the same may be carried into effect reference will now be made to the accompanying drawing, in which.

Figure 1:
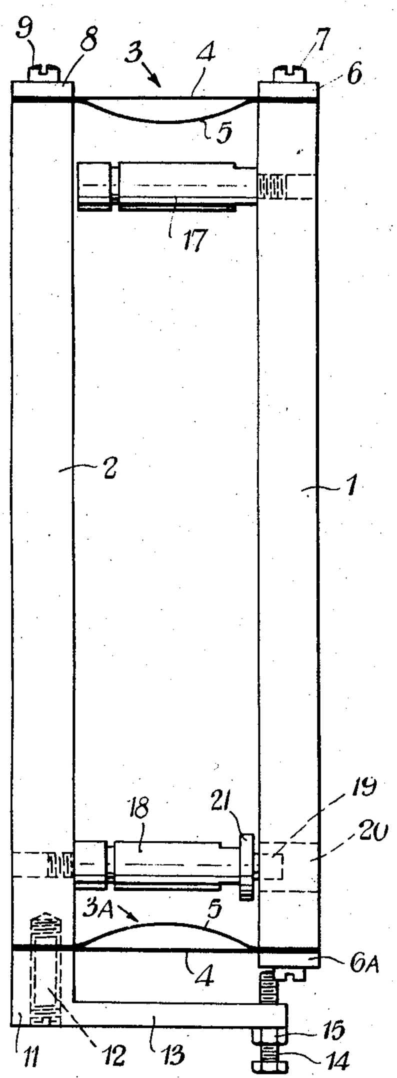
Figure 1 is a side elevation of a mechanical guiding device.

The mechanical guiding device has a vertically disposed square-sectioned fixed bar 1 beside which is disposed an equal-sized vertically disposed square-sectioned movable bar 2. The movable bar 2 is guided for movement parallel to the fixed bar 1 by means of two spring strip arrangements 3 and 3A which connect the movable bar 2 to the fixed bar 1.

The spring strip arrangement 3 connects the upper end of the fixed bar 1 to the adjacent end of the movable bar 2 and the spring strip arrangement 3A connects the lower end of the fixed bar 1 to the lower end of the movable bar 2.

Each spring strip arrangement consists of two spring strips 4 and 5, the strip 4, in the normal position of the device, being flat and the strip 5 being bowed. The end portion 5A of the bowed strip 5 contacts the end portion 4A of the flat strip 4 and the end portion 5B of the bowed strip 5 contacts the end portion 4B of the flat strip 4. The end portions 4A, 5A of the arrangement 3 are clamped between the adjacent end of the fixed bar 1 and a block 6 which is secured by two screws 7 to the end of the fixed bar 1. The end portions 4B, 5B of these strips 4, 5 are clamped between the adjacent end of the movable bar 2 and a block 8 which is secured by two screws 9 to the end of the movable bar 2. The screws 7, 9 pass through holes 10 in the strips 4, 5. The spring strip arrangement 3A similarly connects the other ends of the fixed and movable bars 1 and 2, except that instead of a block corresponding to the block 8, there is employed a member 11 secured by screws 12 to the bar 2 and having a horizontal tongue 13. A vertical bolt

14 is passed upwardly through the free end of the tongue 13 and is locked to the tongue 13 by a nut 15. The bolt 14 is arranged, upon upward movement of the movable bar 2, to encounter the block 6A on the lower end of the bar 1 and thereby limit upward movement of the bar 2.

Each bowed spring strip 5 is concave towards its associated flat spring strip 4 and maintains the latter in tension. It is to be understood that the natural state of each bowed spring strip 5 is the flat state and each bowed strip 5 only becomes bowed because the effective length thereof is longer than that of the associated flat spring strip 4 which the bowed strip 5 is secured to and maintains in tension. The convex side of each bowed spring strip 5 faces the spring strip arrangement 3 or 3A at the opposite end of the guiding device.

Figure 2:
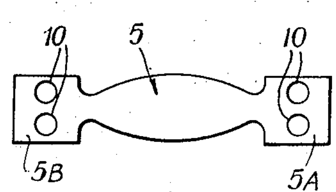
Figures 2 and 3 are plan views of spring strips employed in the device of Figure 1.
Figure 3:
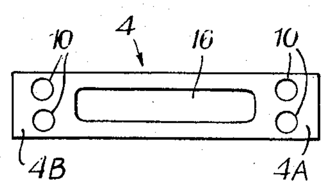

Each flat strip 4 (Figure 3) has a central rectangular shaped cut-out 16 extending throughout the free length of the strip, i.e. throughout the unclamped length of the strip, this being the effective length of the strip. Effectively therefore the flat strip consists of two coplanar side-by-side strips. Each bowed strip (Figure 2) over its effective, i.e. unclamped, length is of greatest width at the centre and narrows towards each end being narrowest at the ends of the effective length. The narrowest width may be as little as ⅕ of the width at the centre.

A pin 17 secured to the bar 1 extends towards the bar 2 and terminates close to the latter bar. A pin 18 secured to the bar 2 extends towards the bar 1 and has an end portion 19 of reduced diameter that is entered with clearance in a hole 20 in the bar 1. A flange 21 is formed on the pin 18 at a location close to the bar 1. If the bars 1 and 2 should be pushed towards each other the movement of the bars towards each other is limited by the free end of the pin 17 abutting against the bar 2 and the flange 21 abutting against the bar 1. The end portion 19 disposed in the hole 20 acts as a stop limiting endwise movement of the bar 2 with respect to the bar 1.

It will be noted that the two bowed spring strips 5 are between the two flat spring strips 4 and the latter do not have their outer surfaces obscured by any bowed strips of the device. This has the advantage of allowing the flat strips 4 easily to be examined when the device is being assembled. It is important when the device is being assembled to ensure that each flat spring strip 4 is in uniform tension over the whole of its cross-section. If one of the flat spring strips 4 is not in uniform tension over the whole of its cross-section, it is found that the guiding device is not sufficiently rigid to side loading. The guiding device described above permits the flat spring strips 4 to be examined during assembly to ensure uniformity of tension over the width of the flat strips.

In use of the mechanical guiding device, movement is applied, for example, by a measuring anvil, to one end of the movable bar 2 in a direction longitudinally of the latter and the other end of the movable bar 2 moves correspondingly and transmits motion to, for example, part of the mechanism of a comparator or other measuring apparatus.

I claim:

1. A mechanical guiding device arranged for guiding the movement of a movable member with respect to a fixed member, the movable member being maintained in relation to the fixed member through the intermediary of first and second spring strip arrangements, wherein each spring strip arrangement comprises two spring strips one end of each of which is secured to the fixed member and the other end of each strip being secured to the movable member, one of the spring strips being effectively shorter than the other spring strip so that the latter assumes an arcuate form and maintains said one strip in tension, wherein said arcuate strips are between said one strips, and wherein that side of each said one strip that is remote from the other spring strip arrangement faces away from all the remaining spring strips of the device.

2. A mechanical guiding device as claimed in claim 1, wherein each said one strip has a central cutout extending over the effective length of the strip.

3. A mechanical guiding device as claimed in claim 1, wherein each said arcuate strip is, over its effective length, of narrower width at the end portions of this length than at the central portion.

References Cited in the file of this patent

UNITED STATES PATENTS

| | | |
|---|---|---|
| 1,347,316 | Akimoff | July 20, 1920 |
| 2,219,037 | Street | Oct. 22, 1940 |
| 2,331,779 | Hjarpe et al. | Oct. 12, 1943 |
| 2,753,176 | List | July 3, 1956 |